(12) United States Patent
Safaee

(10) Patent No.: US 9,694,702 B2
(45) Date of Patent: Jul. 4, 2017

(54) CIRCUIT ARRANGEMENT AND METHOD OF OPERATING A CIRCUIT ARRANGEMENT

(71) Applicant: Bombardier Transportation GmbH, Berlin (DE)

(72) Inventor: Alireza Safaee, Danvers, MA (US)

(73) Assignee: Bombardier Transportation GmbH, Berlin (DE)

( * ) Notice: Subject to any disclaimer, the term of this patent is extended or adjusted under 35 U.S.C. 154(b) by 310 days.

(21) Appl. No.: 14/427,271

(22) PCT Filed: Sep. 10, 2013

(86) PCT No.: PCT/EP2013/068687
§ 371 (c)(1),
(2) Date: Mar. 10, 2015

(87) PCT Pub. No.: WO2014/040975
PCT Pub. Date: Mar. 20, 2014

(65) Prior Publication Data
US 2015/0217646 A1   Aug. 6, 2015

(30) Foreign Application Priority Data

Sep. 11, 2012   (GB) .................................. 1216184.0

(51) Int. Cl.
*H02J 1/02*        (2006.01)
*H02M 1/12*        (2006.01)
(Continued)

(52) U.S. Cl.
CPC ............ *B60L 11/182* (2013.01); *B60L 5/005* (2013.01); *H02J 5/005* (2013.01); *H02J 7/025* (2013.01);
(Continued)

(58) Field of Classification Search
CPC .... B60L 11/182; B60L 5/005; B60L 2200/26; H02J 5/005; H02J 7/025; B60M 1/36;
(Continued)

(56) References Cited

U.S. PATENT DOCUMENTS 5,499,178 A  *  3/1996  Mohan ...................... H02J 3/01
                                                        307/105
5,831,841 A     11/1998  Nishino
(Continued)

FOREIGN PATENT DOCUMENTS

FR    2962264 A1    1/2012
WO    9908359 A1    2/1999

OTHER PUBLICATIONS

Eghtesadi, "Inductive Power Transfer to an Electric Vehicle-Analytical Model", May 6, 1990; May 6, 1990-May 9, 1990, May 6, 1990, pp. 100-104, XP010003680.
(Continued)

*Primary Examiner* — Brandon S Cole
(74) *Attorney, Agent, or Firm* — The Webb Law Firm

(57) ABSTRACT

The invention relates to a circuit arrangement of an electric vehicle, in particular a circuit arrangement of an electric vehicle for inductive power transfer to the vehicle, and a method of operating the named circuit arrangement. The circuit arrangement includes an impedance and at least one rectifier for rectifying an AC voltage. An AC part of the circuit arrangement includes the impedance. The rectifier connects the AC part to a DC part of the circuit arrangement. The circuit arrangement further includes at least one current control means for controlling a current flow in the AC part vehicle.

20 Claims, 3 Drawing Sheets

(51) Int. Cl.
  *H02M 1/14* (2006.01)
  *B60M 1/36* (2006.01)
  *B60L 11/18* (2006.01)
  *B60L 5/00* (2006.01)
  *H02J 5/00* (2016.01)
  *H02J 7/02* (2016.01)

(52) U.S. Cl.
  CPC ............ *B60L 2200/26* (2013.01); *B60M 1/36* (2013.01); *Y02T 10/7005* (2013.01); *Y02T 10/7072* (2013.01); *Y02T 90/122* (2013.01); *Y02T 90/14* (2013.01)

(58) Field of Classification Search
  CPC ............ Y02T 10/7005; Y02T 10/7072; Y02T 90/122; Y02T 90/14
  USPC .................................................. 307/9.1–10.8
  See application file for complete search history.

(56) References Cited

U.S. PATENT DOCUMENTS

| | | | |
|---|---|---|---|
| 6,166,929 A * | 12/2000 | Ma | H02P 5/74 363/37 |
| 6,483,202 B1 | 11/2002 | Boys | |
| 6,515,878 B1 | 2/2003 | Meins et al. | |
| 6,705,441 B1 | 3/2004 | Boys et al. | |
| 7,554,316 B2 | 6/2009 | Stevens et al. | |
| 8,054,651 B2 | 11/2011 | Pollard | |
| 9,407,134 B2 * | 8/2016 | Moghadas | H02M 1/32 |
| 9,525,377 B2 * | 12/2016 | Wang | H02P 21/08 |
| 2007/0210583 A1 * | 9/2007 | Stahlhut | H02P 9/305 290/52 |
| 2009/0174263 A1 | 7/2009 | Baarman et al. | |
| 2010/0194329 A1 * | 8/2010 | Lu | H02P 21/16 318/798 |
| 2010/0264747 A1 | 10/2010 | Hall et al. | |
| 2011/0254379 A1 | 10/2011 | Madawala | |
| 2012/0098350 A1 | 4/2012 | Campanella et al. | |
| 2013/0057297 A1 * | 3/2013 | Cheng | H02M 1/32 324/548 |
| 2013/0076143 A1 * | 3/2013 | Guo | H02J 9/04 307/66 |

OTHER PUBLICATIONS

Covic et al., "Inductive Power Transfer (IPT) Powering our future", 2010, Retrieved from the Internet: http://ceme.ece.Illinois.edu/seminars/CEME910Covic.pdf.

* cited by examiner

State of the art

CIRCUIT ARRANGEMENT AND METHOD OF OPERATING A CIRCUIT ARRANGEMENT

CROSS REFERENCE TO RELATED APPLICATIONS

This application is the United States national phase of International Application No. PCT/EP2013/068687 filed Sep. 10, 2013, and claims priority to United Kingdom Patent Application No. 1216184.0 filed Sep. 11, 2012, the disclosures of which are hereby incorporated in their entirety by reference.

BACKGROUND OF THE INVENTION

Field of the Invention

The invention relates to a circuit arrangement of an electric vehicle, in particular a vehicle-sided circuit arrangement of a system for inductive power transfer to the vehicle. Furthermore, the invention relates to a method of operating the named circuit arrangement. Further, the invention relates to a method of manufacturing a circuit arrangement of an electric vehicle and to an electric vehicle.

Description of Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase windings. A first set is installed on the ground (primary windings) and can be fed by a wayside power converter (WPC). The second set of windings is installed on the vehicle. For example, the second set of windings can be attached underneath the vehicle, in the case of trams under some of its wagons. The second set of windings or, generally, the secondary side is often referred to as pick-up-arrangement or receiver. The first set of windings and the second set of windings form a high frequency transformer to transform electric energy to the vehicle. This can be done in a static state (when there is no movement of the vehicle) and in a dynamic state (when the vehicle moves).

Due to presence of a large clearance between the primary windings and the secondary windings, the operational behavior of this transformer is different than the behavior of conventional transformers which have a closed magnetic core with negligible or small air gaps. The large air gap results in smaller mutual inductive coupling and larger leakage inductances.

The leakage inductance usually acts as a series inductance with each winding of the primary windings and of the secondary windings. To be able to transfer high power levels, it is necessary to use an adequate capacitance in order to compensate the reactance of the inductors at an operating frequency of e.g. 20 kHz. The combination of the (leakage) inductance and the (compensating) capacitance forms a resonance circuit. A perfect impedance cancellation happens if impedance values of the inductance and the capacitance are chosen such that the natural resonance frequency of the resonant circuit is equal to the operating frequency. Such a resonant circuit is tuned.

Subject to temperature changes and/or aging, a tolerance of a compensating capacitance can increase. This may result in detuning of the resonant circuit, wherein the changed resonant frequency does not correspond to the operating frequency. Such a detuning deviates the overall performance and the power transfer capability of the inductive power transfer system. Also, an impedance of the secondary side reflected to the primary side of the transformer can become capacitive. This can result in a leading current with respect to the voltage in the WPC which is highly unwanted because a leading current eliminates soft switching conditions of semiconductor switches and increases their power losses considerably. Under such operation conditions, a WPC can overheat and turn off which, in turn, interrupts the needed power transfer.

U.S. Pat. No. 7,554,316 B2 discloses an inductive power transfer system comprising a primary unit, having a primary coil and an electrical drive circuitry connected to the primary coil for applying electrical drive signals thereto so as to generate an electromagnetic field. The system also comprises at least one secondary device. The secondary device is separable from the primary unit and has a secondary coil adapted to couple with said field when the secondary device is in proximity to the primary unit. In this way, power can be transferred inductively from the primary unit to the secondary device without direct electrical conductive contacts there between. The primary unit further comprises a control unit operable to cause a circuit including said primary coil to operate, during a measurement period, in an undriven resonating condition in which the application of said drive signals to said primary coil by said electrical drive circuitry is suspended so that energy stored in said circuit decays over the course of said period. Further, the primary unit comprises a decay measurement unit operable to take one or more measures of such energy decay during said period, wherein said control unit is further operable, in dependence upon said one or more energy decay measures, to control the electrical drive circuitry so as to restrict or stop inductive power transfer from the primary unit. On the secondary side, the system comprises a dummy load switch which can be controlled by a secondary control unit selectively.

US 2011/0254379 A1 shows a pick-up for an inductive power transfer system, wherein the pick-up comprises a phase detector for detecting the phase of a voltage in a primary conductive path with which the pick-up is inductively coupled in use. Furthermore, the pick-up comprises a converter allowing adjustable phase and a controller adapted to control the power transfer between the primary conductive path and a load associated with the pick-up, by controlling at least the phase angle of the converter with respect to that of the primary conductive path voltage.

WO 99/08359 A1 discloses a contactless system to magnetically transfer electric power from an input power source to a secondary load, comprising a primary energy converter connectable to the input power source and including an output inverter; a primary inductive loop connected to the output inverter, the loop including at least one turn which is compensated to unity power factor; a secondary pickup coil magnetically coupled to the primary inductive loop and compensated to unity power factor; and a secondary energy converter connected to the secondary pickup coil, the secondary energy converter including an input inverter and being connectable to the secondary load.

It is an object of the present invention to provide a circuit arrangement of an electric vehicle, in particular a vehicle-sided circuit arrangement of a system for inductive power transfer to the vehicle, and a method of operating said circuit arrangement by which an inductive power transfer to the vehicle can be optimized even in the case that electrical properties of elements of the circuit arrangement change. Further objects of the invention are to provide a method of manufacturing a circuit arrangement and to provide an electric vehicle system architecture comprising such a circuit arrangement.

SUMMARY OF THE INVENTION

It is a basic idea of the invention to actively control a current flow within an alternating current part of a vehicle-sided circuit arrangement, wherein the circuit arrangement or elements of the circuit arrangement is/are adapted to receive an electromagnetic field and to produce an alternating electric current by electromagnetic induction. In particular, a current flow through an impedance of the circuit arrangement can be controlled, wherein the impedance or a part of the impedance is provided by a leakage inductance and a compensating capacitance. By proper controlling of the current flow, it is possible to compensate a power drop due to changing electrical properties of the compensating capacitance (detuning) and to keep the system performance at the same level as a perfectly tuned system.

The present invention can be applied to any land vehicle (including but not preferably, any vehicle which is only temporarily on land), in particular track-bound vehicles, such as rail vehicles (e.g. trams), but also to road automobiles, such as individual (private) passenger cars or public transport vehicles (e.g. busses including trolley busses which are also track-bound vehicles).

A circuit arrangement, in particular a circuit arrangement of an electric vehicle for inductive power transfer to the vehicle, is proposed. The circuit arrangement can be a part of the traction system of the electric vehicle. The circuit arrangement comprises at least one electric element (source element) to receive a magnetic field and to generate an induced electric output voltage, e.g. a coil. The circuit arrangement can comprise the aforementioned secondary windings of a transformer, wherein the transformer is used to transfer energy from primary windings, which can be installed in a ground providing a driving surface for the vehicle, to the vehicle. The circuit arrangement or elements of the circuit arrangement can be part of a pick-up-arrangement of the vehicle, which can e.g. be installed at a bottom side of the vehicle.

The circuit arrangement and/or elements of the circuit arrangement provide(s) an impedance. Furthermore, the circuit arrangement comprises at least one rectifier for rectifying the induced AC voltage which is induced by the magnetic field.

The circuit arrangement comprises an alternating current part (AC part) and a direct current part (DC part). In the following, AC refers to an alternating current and DC refers to a direct current. The AC part comprises or provides the impedance and the aforementioned source element. The rectifier connects the AC part to the DC part of the circuit arrangement. For example, input terminals of the rectifier can be connected to the AC part and output terminals of the rectifier can be connected to the DC part of the proposed circuit arrangement.

The impedance can be provided by an inductance, in particular a leakage inductance which depends at least partially on the size of the air gap between a primary side (primary windings) and the secondary side (secondary windings) of the aforementioned transformer. Furthermore, another part of the impedance can be provided by a capacitance, in particular a compensating capacitance which is used to tune the circuit arrangement. The compensating capacitance can e.g. be provided by one or more compensating capacitors. The impedance can therefore be an impedance of a resonant circuit provided by the aforementioned inductance(s) and capacitance(s). The circuit arrangement may be a tuned circuit arrangement. In this case, a resonant frequency (or natural frequency) of the aforementioned resonant circuit is equal to a predetermined operating frequency of the inductive power transfer which can e.g. be 20 kHz. It is, however, also possible that the circuit arrangement is a detuned circuit arrangement, wherein the resonant frequency differs from the operating frequency. This will be explained later.

According to the invention, the circuit arrangement further comprises at least one current control means for controlling a current flow in the AC part. In particular, the current control means controls a current flow through the aforementioned impedance or through an element providing a part of the impedance. The current control means can control a RMS-value (route means square value) or effective value of the current flowing in the AC part. The current in the AC part can also be referred to as phase current.

Controlling the current in the AC part of the proposed circuit arrangement advantageously allows controlling an amount of power transferred to the vehicle. If, for example, a tuned circuit arrangement is detuned, e.g. due to temperature influences and/or aging of the compensating capacitor, the power transferred from the primary side to the vehicle-sided secondary side drops. By controlling the current, this power drop can be compensated, e.g. by increasing or decreasing the current flowing through the impedance. The proposed circuit arrangement also allows compensating variations of the transferred power due to variations of the air gap between the primary side and the secondary side, e.g. due to road disturbances or mechanical reasons.

A leakage inductance of a system for an inductive energy transfer to a vehicle is usually large which, in turn, necessitates a small value of a compensating capacitance to achieve a tuned circuit arrangement. Due to this small value of a compensating capacitance, its reactance is high. In this case, high currents passing the capacitive element(s) can result in high voltages across these elements. In order to have such high voltage elements, in particular across the capacitors with small capacitances, it is usually necessary to connect many capacitors in series. This, however, increases an equivalent series resistance and ohmic losses of the circuit arrangement. Also, it is necessary to have an adequate cooling system to remove the resulting excess heat. This adds weight, volume, complexity, sensitivity and costs to a vehicle comprising the circuit arrangement. By adding control means for controlling the current in the alternating current part of the circuit arrangement, the aforementioned disadvantages can be advantageously reduced. Also, the proposed circuit arrangement allows a flexible control of the power flow. Therefore, the proposed circuit arrangement is able to compensate the effects of detuning, e.g. if a temperature- and age-dependence of the compensating capacitance leads to a short duration of a tuning validity.

Another advantage of the proposed circuit arrangement is that the process of finding a correct combination of compensating capacitors for tuning the circuit arrangement, which is difficult, time consuming and labor intensive, is simplified as the added control of the current in the AC part allows to balance the current flow.

Another advantage of the proposed circuit arrangement is that a net impedance of the circuit arrangement reflected to a primary side can be controlled. By controlling the net impedance, leading currents which eliminate soft switching conditions of semiconductor switches on the primary side and increase power losses on the primary side can be avoided.

Another important advantage of the proposed circuit arrangement is that the circuit arrangement can initially be designed as a detuned circuit arrangement with respect to a given operating frequency. In particular, a compensating capacitance can be chosen such that in an unaltered configuration of the circuit arrangement, the circuit arrangement is detuned. If the compensating capacitance is chosen such that the circuit is at perfect tuning (or very close to this condition), in the case of any short circuit event, there is a very small impedance of the circuit arrangement to limit a short circuit current if the circuit arrangement is operated at its or close to the resonant frequency which can be equal to a given operating frequency. This short circuit current can generate high voltages across the capacitors providing the compensating capacitance. Such an over-voltage can damage the capacitors or reduce their lifetime or alter their electric properties. If the circuit arrangement is initially designed as a detuned circuit arrangement, this effect can be reduced. In this case, the current control means can control the current in the AC part of the circuit arrangement such that a power drop due to the detuned properties of the circuit arrangement is compensated for.

Further, the impedance is provided by an inductance, in particular a leakage inductance, and a capacitance. The capacitance can e.g. be provided by one or more compensating capacitor(s). The capacitance is connected in series to the inductance. Furthermore, the rectifier is connected in series to the capacitance. Thus, the circuit arrangement, in particular the alternating current part of the circuit arrangement, is set up in a series resonant configuration.

This is of advantage because a series resonant circuit provides a resonant configuration which does not need a direct current inductor in the rectifier. Hence, a weight, costs and unwanted dynamics in an output voltage of the rectifier are reduced.

Further, the circuit arrangement comprises a voltage generator, wherein the voltage generator is arranged such that an output voltage of the voltage generator is fed into the AC part of the circuit arrangement. In particular, the voltage generator can be arranged such that the output voltage is added to an induced voltage which can be provided by the aforementioned source element. By applying the output voltage of the voltage generator into the AC part of the circuit arrangement, a voltage falling across the impedance can be adjusted or controlled. In this way, a current flowing through the impedance can be controlled in order to achieve a desired power transfer. In other words, the voltage generator is used as the aforementioned current control means.

Using a voltage generator advantageously allows a simple design of a current control means which can also be easily connected to an existing circuit arrangement. This is possible because this circuit is connected in parallel and not in series.

Further, the voltage generator is an inverter. An inverter is an electronic component or an electric circuit which can change or transform a DC voltage into an AC voltage. The inverter or an electric path comprising the inverter is connected in parallel to the rectifier or an electric path of the circuit arrangement comprising the rectifier. In particular, input terminals of the inverter can be connected to the DC part of the circuit arrangement (via diodes) and output terminals of the inverter can be connected to the AC part of the proposed circuit arrangement. In this case, an AC output voltage of the inverter is generated from a DC input voltage which is provided by the DC part of the circuit arrangement.

This advantageously allows designing a circuit arrangement with no additional energy storage, e.g. no external voltage source or battery. Furthermore, the inverter can be controlled such that a desired output voltage is generated from a wide range of DC input voltages. Therefore, a flexible circuit arrangement is provided which can easily be adapted to compensate for variations of power transferred to the vehicle.

In another embodiment, the DC part of the circuit arrangement comprises a circuit capacitance. The circuit capacitance can be provided by a DC capacitor, wherein a DC link voltage or intermediate circuit voltage falls across the DC capacitor. The capacitor can be connected in parallel with (the output of) the rectifier. The inverter is connected in parallel to a series connection of the rectifier and the circuit capacitance.

The proposed circuit arrangement advantageously allows that the proposed inverter can generate a controlled AC voltage out of electric energy stored in the circuit capacitance arranged on the DC part of the circuit arrangement. Thus, the inverter can operate independently, e.g. without any extra energy storage element.

In another embodiment, the rectifier is a passive rectifier and/or the inverter is an active inverter. The rectifier can e.g. be a diode rectifier. This advantageously provides the circuit arrangement which generates a DC voltage without using active elements such as semiconductor switches. This reduces a power loss across the rectifier. Also, this increases the reliability of the rectifier.

The inverter can comprise active electric elements, wherein active electric elements need additional, external electrical energy for an operation of the electric elements. The inverter can e.g. comprise semiconductor switches. In particular, the inverter can be a so-called a full-bridge inverter. This will be explained later.

This advantageously allows actively controlling an AC output voltage of the inverter and thus adapting the output voltage of the inverter to changing electrical properties of an impedance of the circuit arrangement. This, in turn, allows controlling the power flow or power transfer to the vehicle.

In a preferred embodiment, the AC part of the circuit arrangement comprises three phases. Each of the phases comprises at least one inductance, in particular a leakage inductance, and at least one capacitance, in particular a compensating capacitance provided by a compensating capacitor. The rectifier is a three-phase rectifier, for example a three-phase diode rectifier.

In this case, the inverter can be a three-phase full-bridge inverter.

Thus, the proposed circuit arrangement can be adapted to a three-phase system for inductively transferring power to the vehicle.

In another preferred embodiment, the inverter is a three-phase full-bridge inverter. The three-phase full-bridge inverter comprises three two-switch legs, wherein the legs are connected in parallel to each other. Each leg comprises a first switching element and a second switching element, which can be for example semiconductor switching elements. The switching elements can be MOSFETs or IGBTs.

A connection point of the switching elements in a first leg of the inverter can be connected to a first phase of the AC part of the circuit arrangement. Correspondingly, connection points of the switching elements of the remaining legs can be connected to the remaining phases of the AC part of the circuit arrangement. Thus, output terminals of the three-phase full-bridge inverter are connected to the AC part of the circuit arrangement.

The inverter or input terminals of the inverter can be connected to the DC part of the circuit arrangement via diodes, which are arranged between DC lines of the inverter and DC lines of the DC part of the circuit arrangement.

Using the mentioned three-phase full-bridge inverter advantageously allows using readily available electrical elements for building the proposed circuit arrangement. The added inverter is usually small, light-weight and not expensive. Also, the components of the three-phase full-bridge inverter are small and do not occupy large space and do not add complexity in production and uniformity of the products. A maximum voltage stress over the switching elements of the said inverter is equal to the DC voltage of the rectifier and therefore, the system can use standard off-the-shelf switching module products.

The added inverter or a subcircuit comprising the inverter is connected in parallel with the rectifier. Therefore, the proposed design of a circuit arrangement can easily be realized by changing an existing design of a circuit arrangement.

A current rating of the inverter is smaller than a main full-wave diode rectifier block. Thus, the power dissipation in the inverter is limited. Using diodes to connect the inverter to the DC part of the circuit arrangement will also block a reverse current flow in case of a short circuit in the inverter. Thus, the presence of a minimum voltage on the DC lines is guaranteed even in the case of a short circuit in the inverter.

Another advantage is that in case of any failure within the inverter, the rectifier is able to operate and feed a load, e.g. a traction motor of a tram, with slightly lower performance. Therefore, a vehicle using the proposed circuit arrangement will be capable of moving to reach a maintenance facility with no interruption in service.

In this three-phase system, each two-switch leg of the inverter is connected to one phase of the AC part of the circuit arrangement. Therefore, it is possible to apply appropriate gating algorithms to switching elements of the respective leg to compensate an inherent asymmetry of impedances of the respective phases. This will be explained later.

In another embodiment, the circuit arrangement further comprises a radio frequency interference filter. The radio frequency interference filter can be arranged within the DC part of the circuit arrangement. In particular, the radio frequency interference filter can be connected in series to (the output of) the rectifier. This advantageously allows eliminating electromagnetic interference, in particular in the radio frequency range, which can affect any nearby systems in an unwanted manner.

In another embodiment, the circuit arrangement comprises sensing means for sensing an output voltage of the rectifier (DC voltage) and/or an output voltage of the DC part of the circuit arrangement. In addition or alternatively, the circuit arrangement comprises sensing means for sensing a phase current, in particular a current flowing through the aforementioned impedance(s). Output signals of the aforementioned sensing means can advantageously be used to control an operation of the inverter, in particular to control duty cycles of the switching elements within legs of the inverter. This will be explained later. Further proposed is a method of operating one of the previously described circuit arrangements.

According to the invention, at least one current control means for controlling a current flow in the AC part, is controlled or operated such that a desired power transfer is achieved. In particular, a current control means is operated such that a transferred power is higher than a predetermined minimal power and smaller than a predetermined maximal power. In addition or alternatively, the current control means can be operated such that a difference between a transferred power and a desired power is smaller than a predetermined value.

The method advantageously allows controlling a power transferred to e.g. a vehicle even if electrical properties of a secondary-sided circuit arrangement for receiving an electromagnetic field, e.g. electrical properties of a compensating capacitance, change.

In another embodiment, the current flow in the AC part of the circuit arrangement is controlled depending on a period and amplitude of an induced AC voltage and an output DC voltage, in particular a voltage level of an output voltage of the direct current part of the circuit arrangement. Additionally, the current flow in the AC part of the circuit arrangement can be controlled depending on an amplitude of the induced AC voltage.

The output voltage of the DC part denotes a direct DC voltage which falls across a load of the circuit arrangement, e.g. a DC electric machine or another inverter to drive an AC electric machine. The AC current in the circuit arrangement and the DC output voltage of the circuit arrangement are determined by the induced voltage, the impedance and the load. To effectively control the current flow in the AC part of the circuit arrangement, a period of the induced voltage, which can be similar to a period of a phase current, has to be known.

This advantageously allows operating the proposed circuit arrangement by only using vehicle-sided signals. Therefore, there is no need to have any communication mechanism to a primary side, or a wayside. This provides more reliability and robustness, as any interference in such communication systems is excluded. Also, the period of the induced voltage and a level of the output DC voltage are usually sensed for other control applications. Thus, no extra sensors are required and the proposed circuit arrangement uses signals from existing sensors.

In another embodiment, the period of an induced AC voltage is determined by a phase locked loop (PLL). In this case, the PLL can determine a period of a phase current, in particular of a current flowing through the impedance which is similar or equal to the period of the induced voltage. One of the functions of the PLL is a method to find a zero crossing moment of the phase currents in each period of an operating frequency without being effected by noise. As will be explained later, this zero crossing moment can be used as a reference time to generate gate signals of switching elements of the inverter.

The use of a PLL to detect a period of the induced voltages or phase currents advantageously provides a circuit arrangement which is robust against variations in a frequency of the induced voltage. Such variations can happen due to many reasons such as different WPC frequencies and Doppler effects due to a movement of the vehicle with various speeds. Thus a power drop due to these frequency variations can be compensated. This is a desirable feature which is difficult to achieve in a system which operates based on a completely tuned circuit arrangement.

In another embodiment, an output voltage of the voltage generator is controlled such that a desired voltage falling across the impedance is achieved. For example, the voltage generator can be operated such that a voltage falling across the impedance is higher than a predetermined minimal voltage and smaller than a predetermined maximal voltage. In addition or alternatively, the voltage generator can be operated such that a difference between a voltage falling across the impedance and a desired voltage is smaller than a predetermined value. The predetermined value can be determined depending on the aforementioned period of an induced alternating current voltage and/or the output voltage of the direct current part of the circuit arrangement.

In another embodiment, an output voltage of the inverter is controlled such that a desired voltage falling across the impedance is achieved. In this case, the inverter provides the aforementioned voltage generator. The output voltage of the inverter can be controlled by controlling active elements of the inverter.

In a preferred embodiment, duty cycles of the first and second switching elements of a two-switch leg of the inverter are controlled such that a desired output voltage of the inverter is achieved. A duty cycle denotes a ratio of an on-time of a switching element and a period of the induced voltage.

By changing the duty cycles of the respective switching elements, an AC output voltage of the inverter can be controlled. This advantageously allows a simple control of parameters of the AC output voltage of the inverter. The switching elements can e.g. be semiconductor elements, wherein duty cycles of the semiconductor elements are controlled by gate signals of the semiconductor elements.

In another embodiment, duty cycles of first and second switching elements of two-switch legs of a three-phase full-bridge inverter are controlled such that a desired output voltage of the inverter is achieved. In total, six switching elements are controlled by the proposed method. Since a connection point of the switching elements of one leg may be connected to one phase of the AC part of the circuit arrangement, controlling the switching elements advantageously allows generating three independent output voltages of the inverter. As detuning may not happen similarly in all three phases, the proposed circuit arrangement is able to provide an individual compensation needed for each phase. By generating different gating signals and therefore applying different duty cycles for switching elements of different legs, an asymmetrical detuning (different detuning for each phase) can be addressed effectively.

In another embodiment, a duty cycle is determined depending on an output voltage of the direct current part of the transmission circuit and/or a phase current of the alternating part of the transmission circuit.

A phase locked loop can be used to find a zero crossing moment of the phase current. This zero crossing moment can be used as a reference time to generate a gate signal. It is an important feature of the proposed circuit arrangement that varying a duty cycle within a range of values for the duty cycle does not affect a magnitude of the output voltage of the DC part and the phase current, in particular a RMS-value of the phase current. This means that the control is not very sensitive to an exact determination of the zero crossing moment. Thus, the proposed method of operating the circuit arrangement is robust against changes within a period of an induced voltage which is reflected by a period of the phase currents.

In another embodiment, the AC part of the circuit arrangement comprises three phases, wherein each of the phases comprises an impedance, wherein at least one current control means controls a current flow in each phase, wherein the at least one control means is operated such that a desired power transfer is achieved. This allows independent control of each phase current. For example, a first current control means can control a current flow in a first phase, wherein a second current control means controls a current flow in a second phase, wherein a third current control means controls a current flow in a third phase. The control means are operated such that a desired power transfer is achieved. In particular, the control means can be operated independently of each other. Furthermore, the control means can be operated depending on an impedance of the respective phase. The impedances of the different phases can be different from each other. This can result in an operation of the first current control means which is different from the second and/or the third control means. In particular, in case that the inverter is a three-phase full-bridge inverter, different duty cycles for the switching elements in each leg can be applied or used. This advantageously allows compensating a variation in the transferred power even if the changes of impedances of different phases are different from each other.

Also, the control unit of the proposed circuit arrangement which controls the control means, e.g. the inverter, can be a vehicle-sided control unit. It can be integrated in an existing controller of any other system of the vehicle, for instance a control unit for a propulsion system.

Further proposed is the method of manufacturing a circuit arrangement, in particular a circuit arrangement of an electric vehicle for an inductive power transfer to the vehicle. The circuit arrangement comprises an impedance and at least one rectifier for rectifying an alternating current voltage (induced voltage), wherein an alternating current part of the circuit arrangement comprises the impedance, wherein the rectifier connects the alternating current part to a direct current part of the circuit arrangement.

According to the invention, at least one current control means is provided and arranged such that a current flow in the alternating current part, in particular through the impedance, can be controlled.

This advantageously allows modifying an existing circuit arrangement by simply adding at least one control means.

In another embodiment, a voltage generator is provided, wherein the voltage generator is arranged such that an output voltage of the voltage generator is fed into the alternating current part of the circuit arrangement.

This advantageously allows manufacturing a circuit arrangement with a simple voltage generator as control means.

In yet another embodiment, an inverter is provided as the voltage generator, wherein the inverter or an electric path comprising the inverter is connected in parallel to the rectifier or an electric path comprising the rectifier. As the inverter is connected in parallel to an existing rectifier, the proposed method advantageously allows simply modifying an existing circuit arrangement.

Further proposed is an electric vehicle comprising one of the aforementioned circuit arrangements. The electric vehicle can be a road automobile or a track-bound vehicle. The electric vehicle is capable to be provided with electric energy by an inductive power transfer. This can be done while the vehicle is moving (dynamic power transfer, e.g.

dynamic charging) or while the vehicle is at a hold (static power transfer, e.g. static charging).

BRIEF DESCRIPTION OF THE DRAWINGS

Examples of the invention will be described with reference to the attached figures in the following.

DETAILED DESCRIPTION OF THE INVENTION

Figure 1:
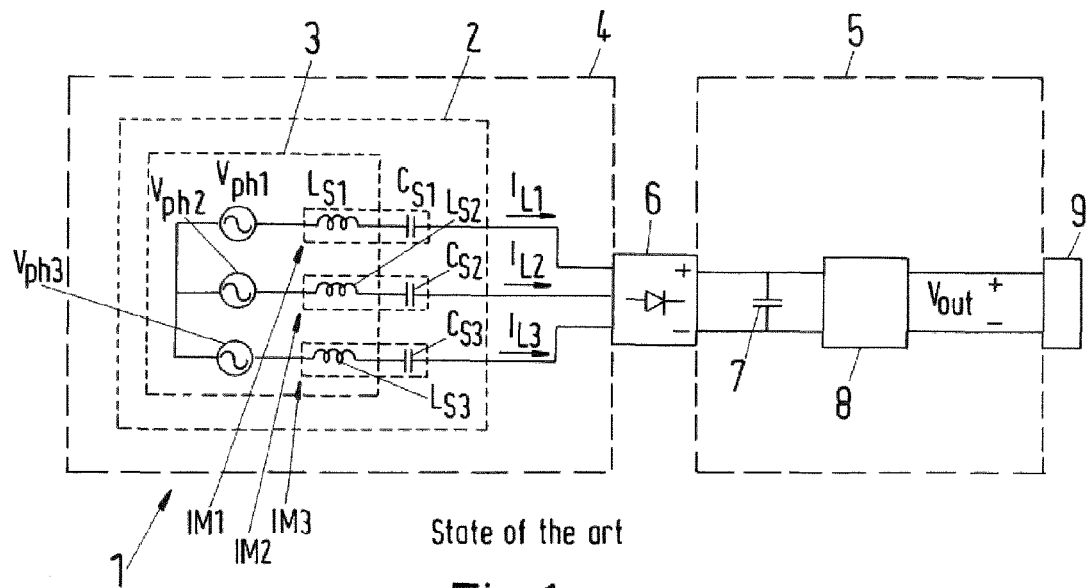
FIG. 1 a schematic circuit diagram of a vehicle-sided circuit arrangement of a system for inductive power transfer to the vehicle according to the state of the art, FIG. 2 a schematic circuit diagram of a wayside circuit arrangement and a vehicle-sided circuit arrangement according to the invention, FIG. 3 an exemplary time course of switching times of a switching element, FIG. 4 an exemplary course of a DC output voltage of a DC part of the proposed circuit arrangement versus a duty cycle of switching elements and FIG. 5 an exemplary course of a phase current of an AC part of the proposed circuit arrangement versus a duty cycle of the switching elements.

FIG. 1 shows a schematic circuit diagram of a vehicle-sided circuit arrangement 1 of a system for inductive power transfer to a vehicle according to the state of the art. The circuit arrangement 1 comprises a so-called pick-up-arrangement 2 which comprises a magnetic part 3. The circuit arrangement 1 comprises an AC part 4 and a DC part 5. The AC part 4 is connected to the DC part 5 via a diode rectifier 6. The AC part 4 comprises three-phases. A first phase comprises a leakage inductance $L_{S1}$ and a compensating capacitance $C_{S1}$. Correspondingly, the other phases comprise leakage inductances $L_{S2}$, $L_{S3}$ and compensating capacitances $C_{S2}$, $C_{S3}$. For a better understanding, source elements $V_{ph1}$, $V_{ph2}$, $V_{ph3}$ are shown which are considered according to a Thevenin equivalent circuit model. Within the real circuit arrangement, there are no such source elements $V_{ph1}$, $V_{ph2}$, $V_{ph3}$. The source elements $V_{ph1}$, $V_{ph2}$, $V_{ph3}$ generate the induced AC voltages.

It is shown that the leakage inductances $L_{S1}$, $L_{S2}$, $L_{S3}$ and the compensating capacitances $C_{S1}$, $C_{S2}$, $C_{S3}$ of each phase are connected in series. Also shown are phase currents $I_{L1}$, $I_{L2}$, $I_{L3}$ of each phase. The rectifier 6 connects the three-phase AC part 4 of the circuit arrangement 1 to the DC part 5 and therefore rectifies an AC voltage of the AC part 4. The DC part 5 comprises a circuit capacitance 7 and a radio frequency interference filter 8. An output voltage of the DC part 5 of the circuit arrangement 1 is denoted by $V_{out}$. Also shown is a load 9 which is connected to an output of the DC part 5.

In each phase of the AC part 4, a series connection of the leakage inductances $L_{S1}$, $L_{S2}$, $L_{S3}$ and the respective compensating capacitances $C_{S1}$, $C_{S2}$, $C_{S3}$ provides an impedance IM1, IM2, IM3, respectively. The compensating capacitance $C_{S1}$, $C_{S2}$, $C_{S3}$ can e.g. be provided by a compensating capacitor. The impedance IM1, IM2, IM3 of each phase is a sum of impedances of the respective leakage inductance $L_{S1}$, $L_{S2}$, $L_{S3}$ and the respective compensating capacitance $C_{S1}$, $C_{S2}$, $C_{S3}$. These impedances IM1, IM2, IM3 may have unwanted variations. For example, an impedance of each of the compensating capacitances $C_{S1}$, $C_{S2}$, $C_{S3}$ can vary by age and temperature under various operational and ambient conditions. The phase currents $I_{L1}$, $I_{L2}$, $I_{L3}$, and the DC output voltage $V_{out}$ are determined by the induced voltages and the impedances IM1, IM2, IM3 of the respective phase and the load 9. Therefore, even when induced voltages and the load 9 are constant, any variation in the phase impedances IM1, IM2, IM3 can change a power flow. This is called detuning.

Figure 2:
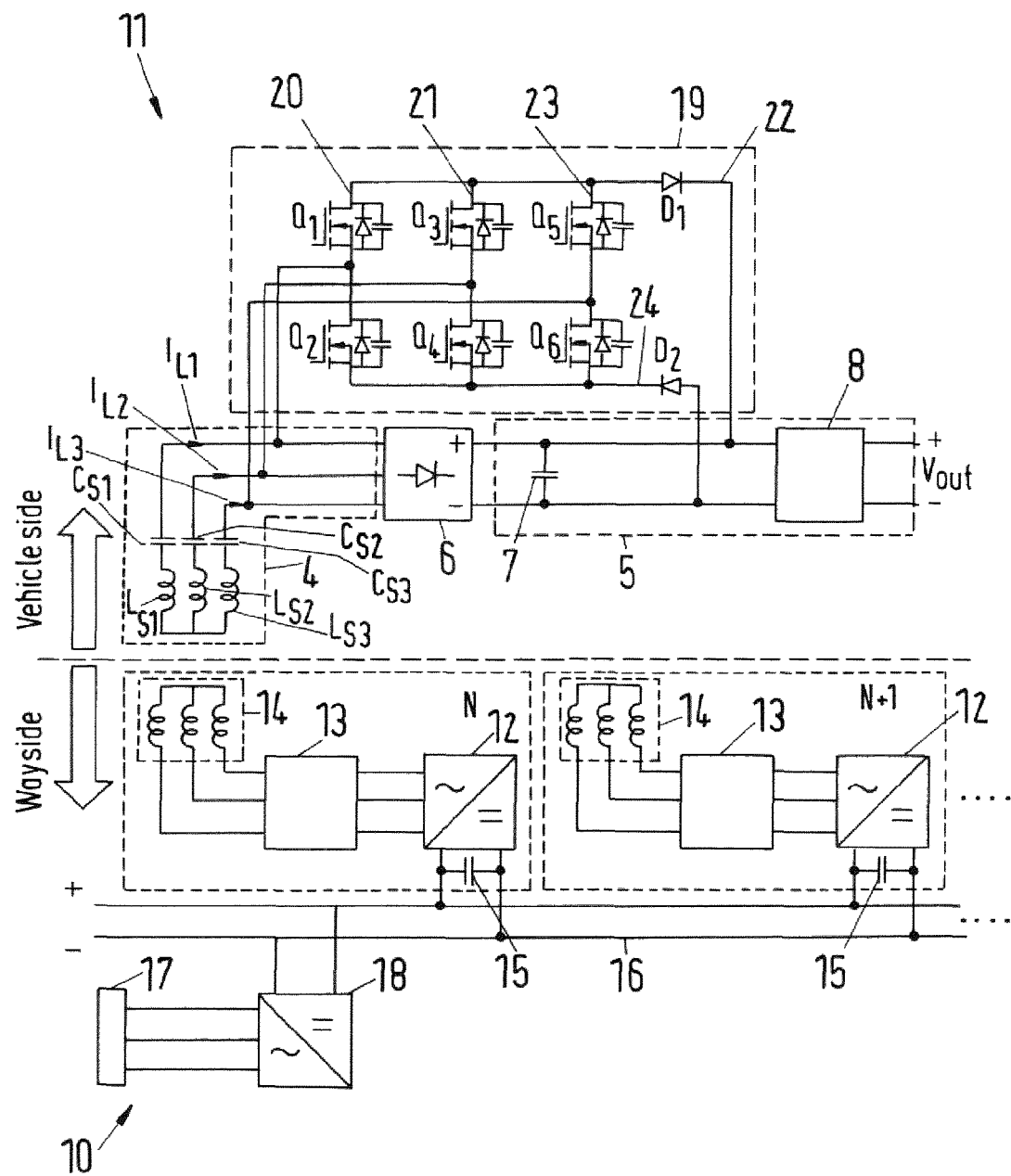

In FIG. 2 a schematic circuit diagram of a wayside circuit arrangement 10 and a vehicle-sided circuit arrangement 11 according to the invention are shown. The wayside circuit arrangement 10 comprises different segments N, N+1 which are arranged along a path of travel of a vehicle traveling on a driving surface of a route. Each segment N, N+1 comprises an inverter 12, a filter circuit 13 and primary windings 14. The inverters 12 are connected via a capacitance 15 to a power line 16 which is fed by a voltage source 17 via a rectifier 18.

As the circuit arrangement 1 in FIG. 1, the circuit arrangement 11 in FIG. 2 comprises an AC part 4, a DC part 5 and a rectifier 6. In FIG. 2, only leakage inductances $L_{S1}$, $L_{S2}$, $L_{S3}$ and compensating capacitances $C_{S1}$, $C_{S2}$, $C_{S3}$ are shown. The circuit arrangement 11 comprises a three-phase full-bridge inverter 19. The inverter 19 is connected in parallel to a connection of the rectifier 6 and a circuit capacitance 7, which is part of the DC part 5 of the circuit arrangement 11. The inverter 19 comprises a first leg 20, a second leg 21 and a third leg 23. Each leg 20, 21, 23 comprises a first switching element Q1, Q3, Q5 which can be referred to as high-side switching element. Furthermore, each leg 20, 21, 23 comprises a second switching element Q2, Q4, Q6 which can be referred to as low-side switching element. A parallel connection of a diode and a capacitor is connected in parallel to each of the switching elements Q1, . . . , Q6. If the switching element has a conducting direction, the diode of said parallel connection is arranged such that it is connected anti-parallel to the respective switching element Q1, . . . , Q6. A connection point of the first switching element Q1 and the second switching element Q2 of the first leg 20 is connected to a first phase of the AC part 4 of the circuit arrangement 11. Correspondingly, connection points of the first switching elements Q3, Q5 and the second switching elements Q4, Q6 of the remaining legs 21, 23 are connected to a second and a third phase of the AC part 4 respectively. A high power line 22 of the inverter 19 is connected via a diode D1 to a high power line of the DC part 5 of the circuit arrangement 11. Correspondingly, a low power line 24 of the inverter 19 is connected via a diode D2 to a low power line of the DC part 5 of the circuit arrangement 11. Because two diodes D1, D2 are used to connect the inverter 19 to the DC part 5 of the circuit arrangement 11, the added inverter 19 does not process the whole power of the system. The added inverter 19 generates a controlled voltage out of an energy stored in the circuit capacitance 7. This (alternating output) voltage is added to an induced voltage of each phase. Therefore, phase currents $I_{L1}$, $I_{L2}$, $I_{L3}$ through the impedances IM1, IM2, IM3 (see FIG. 1) can be controlled. By proper controlling of this additional voltage, it is possible to compensate a power drop and keep the system performance at the level of a perfectly tuned system. A conducting direction of the diode D1 connecting the high power line 22 of the inverter 19 to the DC part 5 is oriented from the inverter 19 towards the DC part 5. A conducting direction of the diode D2 connecting the low power line 24 of the inverter 19 to the DC part 5 is oriented from the DC part 5 towards the inverter 19. Due to the presence of the diodes D1, D2, if any short circuit happens in the inverter 19, the diodes D1, D2 will block a reverse current and a DC output voltage $V_{out}$ of the DC part 5 of the circuit arrangement 11 will still be available. If the forward voltage drop of diodes D1 and D2 is small, it is possible to use two or more diodes in series in order to provide the diode D1 and two or more diodes in series in order to provide the diode D2.

Figure 3:
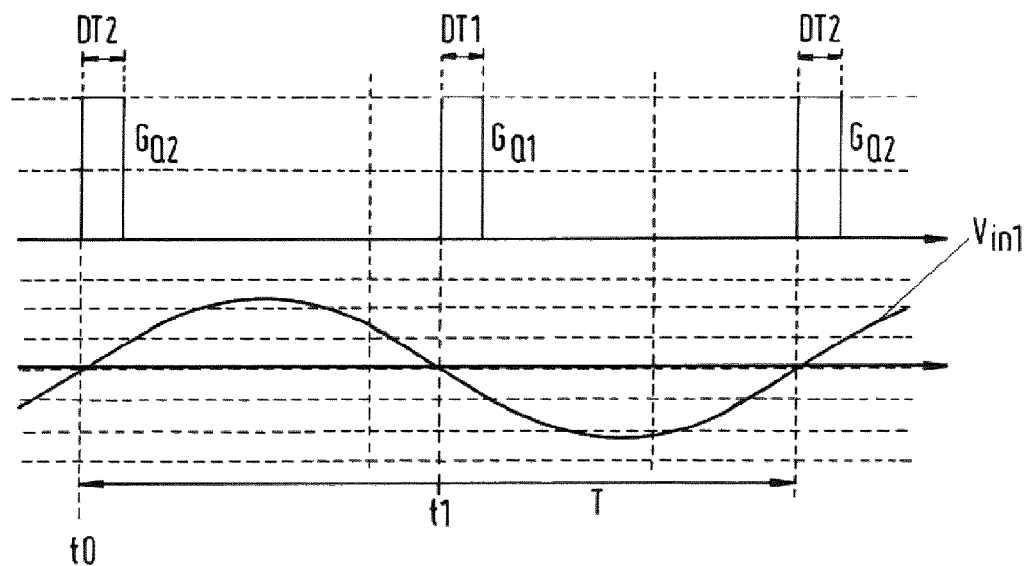

In FIG. 3 an exemplary time course of an induced voltage $V_{in1}$ in a first phase of an AC part 4 (see FIG. 2) and of gate signals $G_{Q1}$, $G_{Q2}$ of switching elements Q1, Q2 of a first leg 20 of an inverter 19 are shown (see FIG. 2). The induced voltage $V_{in1}$ has a period T. This period T is equal for all three-phases. At a first zero crossing moment t0 of the induced voltage $V_{in1}$, the second switching element Q2 is switched on for a predetermined on-time DT2 of the second switching element Q2. At the end of this on-time Q2 is switched off. Correspondingly, the first switching element Q1 is switched on at a second zero crossing moment t1 within the period T for a predetermined on-time DT1. A duty cycle of the first switching element Q1 is defined as the ratio between the on-time DT1 and the time period T. Correspondingly, a duty cycle of the second switching element Q2 is defined as the ratio between the on-time DT2 and the time period T. By controlling the duty cycles of the gating signals $G_{Q2}$, $G_{Q1}$ of the switching elements Q1, Q2, Q3, Q4, Q5, Q6 shown in FIG. 2, it is possible to increase the DC output voltage $V_{out}$ of the DC part 5 or equivalently the phase currents $I_{L1}$, $I_{L2}$, $I_{L3}$. Increasing the phase currents $I_{L1}$, $I_{L2}$, $I_{L3}$ means that RMS-values of the phase currents $I_{L1}$, $I_{L2}$, $I_{L3}$ are increased. A control means or a control circuit for controlling the duty cycles of the switching elements Q1, . . . , Q6 can therefore be operated depending on a DC output voltage $V_{out}$ and a current (RMS−) value of the phase currents $I_{L1}$, $I_{L2}$, $I_{L3}$. Hence, such a control means needs samples of the output voltage $V_{out}$ and the phase currents $I_{L1}$, $I_{L2}$, $I_{L3}$.

Figure 4:
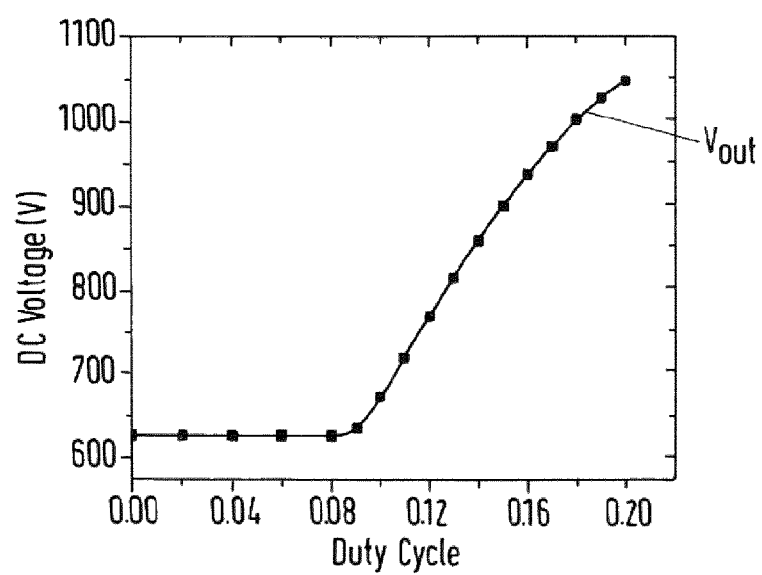

In FIG. 4, a course of a DC output voltage $V_{out}$ vs. different values of a duty cycle is shown. The duty cycle shown in FIG. 4 can be a duty cycle of all switching elements Q1, . . . , Q6 shown in FIG. 2. It is shown that a value of the output voltage $V_{out}$ does not change significantly for duty cycles ranging from 0.00 to approx. 0.08. This shows that a variation in the duty cycle within the interval from 0.00 to 0.08 will not affect the output voltage $V_{out}$ significantly. Thus, a very robust control of the duty cycles is provided which is e.g. insensitive against an incorrect determination of zero crossing moments t0, t1 of an induced voltage $V_{in1}$ (see FIG. 3). For values of the duty cycle higher than 0.08, the output voltage $V_{out}$ increases with an increasing duty cycle in a linear fashion which is highly desirable.

Figure 5:
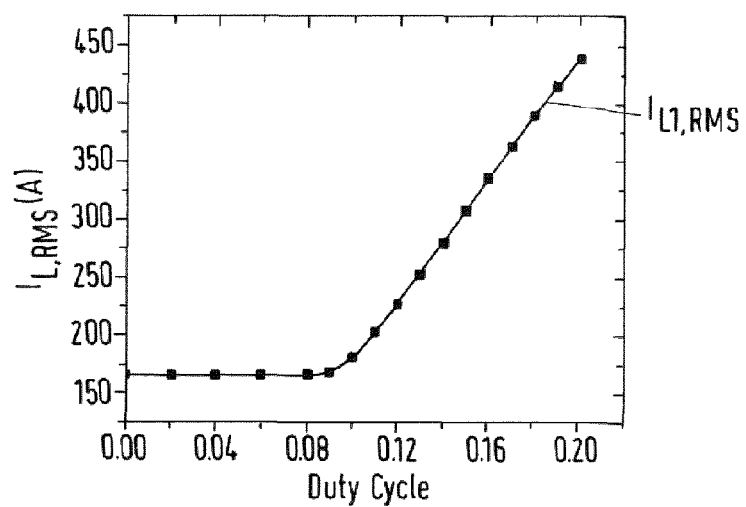

In FIG. 5, an exemplary course of a RMS-value of a phase current $I_{L1,RMS}$ vs. a value of the duty cycle is shown. The behavior of the RMS-value of the phase current $I_{L1,RMS}$ is equivalent to the behavior of an output voltage $V_{out}$ vs. a value of the duty cycle shown in FIG. 4. It is also shown that the RMS-value of the phase current $I_{L1,RMS}$ does not change significantly for duty cycle values ranging from 0.00 to 0.08. For values of the duty cycle larger than 0.08, the RMS-value of the phase current $I_{L1,RMS}$ increases with an increasing value of the duty cycle in a linear fashion which is highly desirable.

The invention claimed is:

1. A circuit arrangement of an electric vehicle for inductive power transfer to the vehicle, wherein the circuit arrangement comprises an impedance and at least one rectifier for rectifying an AC voltage, wherein an AC part of the circuit arrangement comprises the impedance, wherein the rectifier connects the AC part to a DC part of the circuit arrangement, wherein the impedance is provided by an inductance and a capacitance, wherein the circuit arrangement comprises a voltage generator, wherein the voltage generator is arranged such that an output voltage of the voltage generator is fed into the AC part of the circuit arrangement, wherein the voltage generator is an inverter, wherein the inverter or an electric path comprising the inverter is connected in parallel to the rectifier or an electric path comprising the rectifier, wherein the capacitance is connected in series to the inductance, wherein the rectifier is connected in series to the capacitance, wherein the circuit arrangement further comprises at least one current control means for controlling a current flow in the AC part in order to achieve a desired power transfer, and wherein the voltage generator is used as the current control means.

2. The circuit arrangement according to claim 1, wherein the DC part of the circuit arrangement comprises a circuit capacitance, and wherein the inverter is connected in parallel to a series connection of the rectifier and the circuit capacitance.

3. The circuit arrangement according to claim 1, wherein the rectifier is a passive rectifier and/or the inverter is an active inverter.

4. The circuit arrangement according to claim 1, wherein the AC part of the circuit arrangement comprises three phases, wherein each of the phases comprises at least one inductance and at least one capacitance, and wherein the rectifier is a three-phase rectifier.

5. The circuit arrangement according to claim 4, wherein the inverter is a three-phase full-bridge inverter.

6. The circuit arrangement of claim 1, wherein the circuit arrangement further comprises a radio frequency interference filter.

7. The circuit arrangement of claim 1, wherein the circuit arrangement comprises a sensing means for sensing an output voltage of the rectifier and/or a sensing means for sensing an output voltage of the DC part of the circuit arrangement and/or a sensing means for sensing a phase current.

8. A method of operating a circuit arrangement of an electric vehicle for inductive power transfer to the vehicle, wherein the circuit arrangement comprises an impedance and at least one rectifier for rectifying an AC voltage, wherein an AC part of the circuit arrangement comprises the impedance, wherein the rectifier connects the AC part to a DC part of the circuit arrangement, wherein the impedance is provided by an inductance and a capacitance, wherein the circuit arrangement comprises a voltage generator, wherein the voltage generator is arranged such that an output voltage of the voltage generator is fed into the AC part of the circuit arrangement, wherein the voltage generator is an inverter, wherein the inverter or an electric path comprising the inverter is connected in parallel to the rectifier or an electric path comprising the rectifier, wherein the capacitance is connected in series to the inductance, wherein the rectifier is connected in series to the capacitance, wherein at least one current control means for controlling a current flow in the AC part is controlled such that a desired power transfer is achieved, and wherein the voltage generator is used as the current control means.

9. The method of claim 8, wherein the current flow in the AC part of the circuit arrangement is controlled depending on a period of an induced AC voltage and/or an output voltage of the DC part of the circuit arrangement.

10. The method of claim 9, wherein the period of the induced AC voltage is determined by a phase locked loop.

11. The method of claim 8, wherein the voltage generator is arranged such that an output voltage of the voltage generator is fed into the AC part of the circuit arrangement and wherein an output voltage of the voltage generator is controlled such that a desired voltage falling across the impedance is achieved.

12. The method of claim 11, wherein the circuit arrangement comprises an inverter, wherein the inverter or an electric path comprising the inverter is connected in parallel to the rectifier or an electric path comprising the rectifier and wherein an output voltage of the inverter is controlled such that a desired voltage falling across the impedance is achieved.

13. The method of claim 12, wherein the inverter is an active inverter comprising at least one leg, wherein the leg comprises a first switching element and a second switching element, and wherein duty cycles of the first and second switching elements are controlled such that a desired output voltage of the inverter is achieved.

14. The method of claim 12, wherein the inverter is an active three-phase full-bridge inverter comprising three legs, wherein each of the legs comprises a first switching element and a second switching element, and wherein duty cycles of the first and second switching elements are controlled such that a desired output voltage of the inverter is achieved.

15. The method of claim 12, wherein a duty cycle is determined depending on an output voltage of the DC part of the circuit arrangement and/or a phase current of the alternating part of the circuit arrangement.

16. The method of claim 8, wherein the AC part of the circuit arrangement comprises three phases, wherein each of the phases comprises an impedance, wherein at least one current control means controls a current flow in each phase, and wherein the at least one control means is controlled such that a desired power transfer is achieved.

17. A method of manufacturing a circuit arrangement, in particular a circuit arrangement of an electric vehicle for an inductive power transfer to the vehicle, wherein the circuit arrangement comprises an impedance and at least one rectifier for rectifying an AC voltage, wherein an AC part of the circuit arrangement comprises the impedance, wherein the rectifier connects the AC part to a DC part of the circuit arrangement, wherein the impedance is provided by an inductance and a capacitance, wherein the circuit arrangement comprises a voltage generator, wherein the voltage generator is arranged such that an output voltage of the voltage generator is fed into the AC part of the circuit arrangement, wherein the voltage generator is an inverter, wherein the inverter or an electric path comprising the inverter is connected in parallel to the rectifier or an electric path comprising the rectifier, wherein the capacitance is connected in series to the inductance, wherein the rectifier is connected in series to the capacitance, wherein at least one current control means is provided and arranged such that a current flow in the AC part is controllable, and wherein the voltage generator is used as the current control means.

18. The method of claim 17, wherein a voltage generator is provided, and wherein the voltage generator is arranged such that an output voltage of the voltage generator is fed into the AC part of the circuit arrangement.

19. The method of claim 18, wherein an inverter is provided as a voltage generator, and wherein the inverter or an electric path comprising the inverter is connected in parallel to the rectifier or an electric path comprising the rectifier.

20. An electric vehicle, wherein the electric vehicle comprises a circuit arrangement according to claim 1.

* * * * *